(12) United States Patent
Silverbrook

(10) Patent No.: US 6,447,100 B2
(45) Date of Patent: *Sep. 10, 2002

(54) NOZZLE ARRANGEMENT FOR AN INK JET PRINTHEAD WHICH INCLUDES A REFILL ACTUATOR

(75) Inventor: Kia Silverbrook, Balmain (AU)

(73) Assignee: Silverbrook Research Pty Ltd, Balmain, NSW (AU)

( * ) Notice: Subject to any disclaimer, the term of this patent is extended or adjusted under 35 U.S.C. 154(b) by 0 days.

This patent is subject to a terminal disclaimer.

(21) Appl. No.: 09/900,174

(22) Filed: Jul. 9, 2001

Related U.S. Application Data

(63) Continuation-in-part of application No. 09/112,778, filed on Jul. 10, 1998.

(30) Foreign Application Priority Data

Jul. 15, 1997 (AU) .................................................. 08057

(51) Int. Cl.$^7$ ........................... B41J 2/015; B41J 2/135; B41J 2/14; B41J 2/04
(52) U.S. Cl. .............................. 347/54; 347/20; 347/44; 347/47; 347/48
(58) Field of Search ............................ 347/20, 44, 47, 347/54, 84, 85, 67, 65, 48

(56) References Cited

U.S. PATENT DOCUMENTS

| 5,812,159 | A | * | 9/1998 | Anagnostopoulos et al. .. 347/55 |
|---|---|---|---|---|
| 5,838,351 | A | | 11/1998 | Weber |
| 5,903,380 | A | * | 5/1999 | Motamedi et al. .......... 359/224 |
| 6,041,600 | A | | 3/2000 | Silverbrook |
| 6,331,043 | B1 | * | 12/2001 | Shimazu et al. ............... 347/48 |

FOREIGN PATENT DOCUMENTS

| EP | 0416540 A2 | * | 3/1991 | ................... 347/54 |
|---|---|---|---|---|
| JP | 404001051 A | * | 1/1992 | ................... 347/54 |

* cited by examiner

Primary Examiner—Craig A. Hallacher
Assistant Examiner—An H. Do

(57) ABSTRACT

A nozzle arrangement for an ink jet printhead includes a substrate. Nozzle chamber walls are arranged on the substrate to define a nozzle chamber. An ejection actuator is operatively positioned with respect to the nozzle chamber and is displaceable between an inoperative condition and an operative condition to eject ink from the nozzle chamber. The ejection actuator includes an actuating mechanism to facilitate such displacement. A refilling actuator is operatively positioned with respect to the nozzle chamber and is displaceable between an inoperative condition and an operative condition to direct ink into a zone in which the ink can be acted on by the ejection actuator, subsequent to the ejection of ink from the nozzle chamber. The refill actuator includes an actuating mechanism to facilitate such displacement.

13 Claims, 3 Drawing Sheets

NOZZLE ARRANGEMENT FOR AN INK JET PRINTHEAD WHICH INCLUDES A REFILL ACTUATOR

RELATED US APPLICATIONS

This application is a continuation-in-part application of U.S. application Ser. No. 09/112,778 filed Jul. 7, 1998. U.S. application Ser. No. 09/112,778 is hereby incorporated by reference.

FIELD OF THE INVENTION

This invention relates to ink jet printheads. More particularly, this invention relates to a nozzle arrangement for an ink jet printhead which includes a refill actuator.

BACKGROUND OF THE INVENTION

The Applicant has invented an ink jet printhead that is capable of generating text and images at a resolution of up to 1600 dpi.

In order to achieve this, the Applicant has made extensive use of micro electromechanical systems technology. In particular, the Applicant has developed integrated circuit fabrication techniques suitable for the manufacture of such printheads.

The printheads developed by the Applicant can include up to 84000 nozzle arrangements. Each nozzle arrangement has at least one moving component which serves to eject ink from a nozzle chamber. These components usually either act directly on the ink or act on a closure which serves to permit or inhibit the ejection of ink from the nozzle chamber.

The printheads are manufactured in accordance with an integrated circuit fabrication technique. It follows that the moving components are microscopically dimensioned. This is necessary, given the large number of nozzle arrangements per printhead. In order for printheads incorporating such nozzle arrangements to operate efficiently, not only must the moving components be capable of operating at a relatively high speed, it is also necessary that the nozzle chamber be refilled at a speed which is complementary to that of the components.

In use, once a moving component has been displaced within a nozzle chamber to eject ink from the nozzle chamber, that moving component usually returns to an original condition to be ready for again ejecting ink from the nozzle chamber. It is important that, when the moving components return to their original condition, the nozzle chamber is again rapidly filled with ink. This will ensure that, after it has returned to its original condition, the nozzle chamber is filled with ink so that the nozzle arrangement can operate accurately and correctly if activated immediately after it has returned to its original condition.

The present invention has been conceived by the Applicant in order to address the problem of achieving a high refilling rate of the nozzle chamber.

SUMMARY OF THE INVENTION

According to a first aspect of the invention, there is provided a nozzle arrangement for an ink jet printhead, the nozzle arrangement comprising
  a substrate;
  nozzle chamber walls arranged on the substrate to define a nozzle chamber;
  at least one ejection actuator that is operatively positioned with respect to the nozzle chamber, the, or each, ejection actuator being displaceable between an inoperative condition and an operative condition to eject ink from the nozzle chamber and including an actuating mechanism to facilitate such displacement; and
  at least one refilling actuator that is operatively positioned with respect to the nozzle chamber, the, or each, refilling actuator being displaceable between an inoperative condition and an operative condition to direct ink into a zone in which the ink can be acted on by the ejection actuator, subsequent to the ejection of ink from the nozzle chamber, and also including an actuating mechanism to facilitate such displacement.

According to a second aspect of the invention, there is provided an ink jet printhead which comprises
  a substrate; and
  a plurality of nozzle arrangements positioned on the substrate, each nozzle arrangement comprising
    nozzle chamber walls arranged on the substrate to define a nozzle chamber;
    at least one ejection actuator that is operatively positioned with respect to the nozzle chamber, the, or each, ejection actuator being displaceable between an inoperative condition and an operative condition to eject ink from the nozzle chamber and including an actuating mechanism to facilitate such displacement; and
    at least one refilling actuator that is operatively positioned with respect to the nozzle chamber, the, or each, refilling actuator being displaceable between an inoperative condition and an operative condition to direct ink into a zone in which the ink can be acted on by the ejection actuator, subsequent to the ejection of ink from the nozzle chamber, and also including an actuating mechanism to facilitate such displacement.

According to a third aspect of the invention, there is provided a method of ejecting ink from a nozzle arrangement of an ink jet printhead, the nozzle arrangement including a substrate, nozzle chamber walls arranged on the substrate to define a nozzle chamber, at least one ejection actuator that is displaceable between an inoperative and an operative condition to facilitate the ejection of ink from the nozzle chamber and at least one refill actuator that is displaceable between an operative condition and an inoperative condition to direct ink into a zone in which the ink can be acted upon by the ejection actuator, the method including the steps of:
  supplying the nozzle chamber with ink;
  activating the, or each, ejection actuator so that ink is ejected from the nozzle chamber; and
  activating the, or each, refill actuator at a predetermined time after activation of the, or each, ejection actuator so that ink is directed into said zone to be acted upon again by the, or each, ejection actuator, if required.

The invention is now described, by way of example, with reference to the accompanying drawings. The specific nature of the following description should not be construed as limiting in any way the scope of this summary.

DETAILED DESCRIPTION OF THE DRAWINGS

Figure 1:
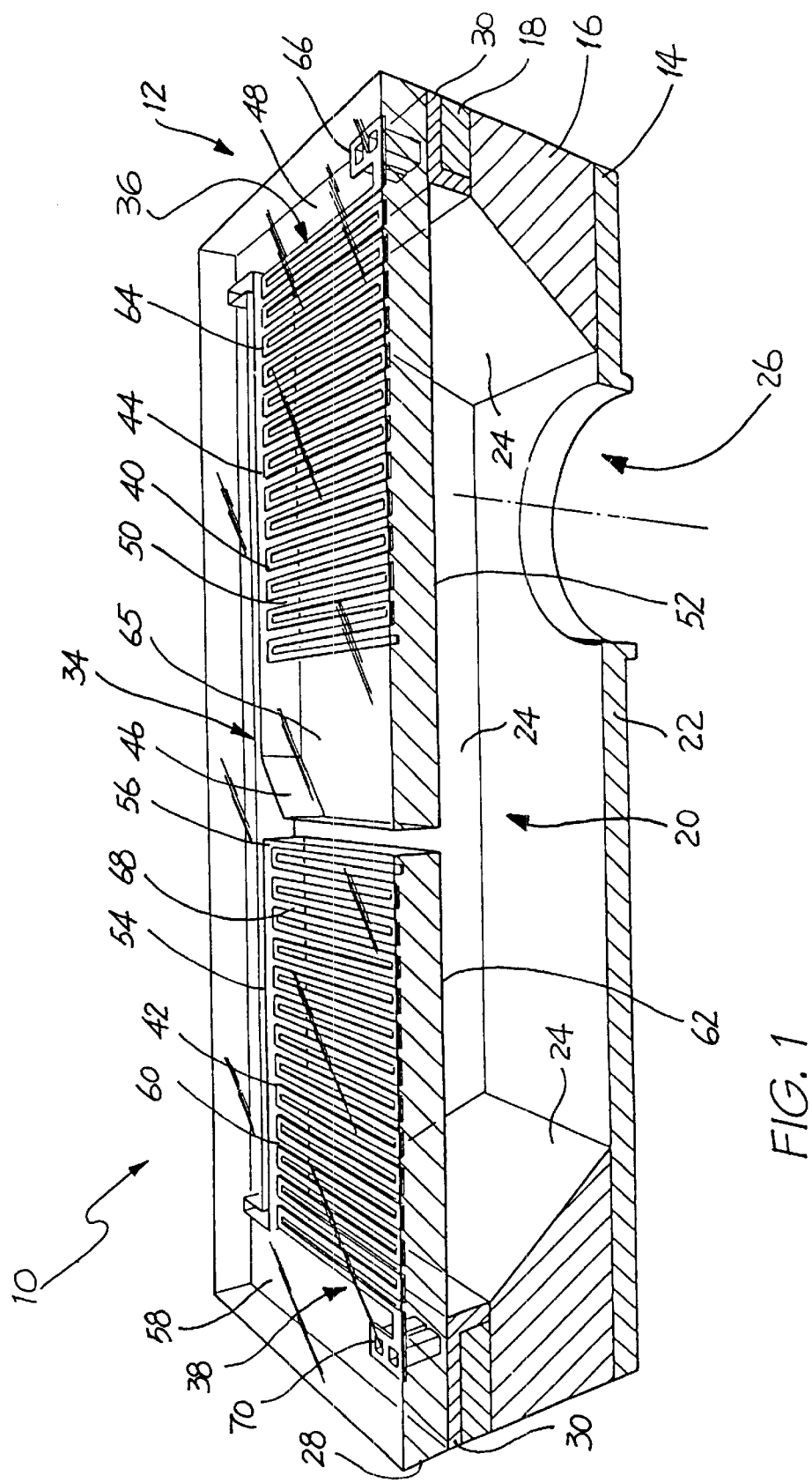
FIG. 1 shows a sectioned three dimensional view of a nozzle arrangement, in accordance with the invention, for an ink jet printhead.

In the drawings, reference numeral 10 generally indicates a nozzle arrangement, in accordance with the invention, for an ink jet printhead, a part of which is indicated at 12.

The ink jet printhead 12 is manufactured in accordance with an integrated circuit fabrication technique. Such techniques involve what is generally a highly controlled and accurate deposition and subsequent etching process. Thus, the printhead 12 includes an etch stop layer 14, a wafer substrate 16 deposited on the etch stop layer 14 and a drive circuitry layer 18 deposited on the wafer substrate 16. The wafer substrate 16 is etched to define a nozzle chamber 20 so that the etch stop layer 14 defines a roof wall 22 of the nozzle chamber 20. It will thus be appreciated that the wafer substrate 16 defines side walls 24 of the nozzle chamber 20.

An ink ejection port 26 is defined by the etch stop layer 14 as a result of an etching process carried out on the etch stop layer 14.

An ink passivation layer 30 is positioned on the drive circuitry layer 18.

A layer 28 of expansion material is positioned on the ink passivation layer 30 to span an ink inlet 32 of the nozzle chamber 20.

The ink inlet 32 and the nozzle chamber 20 both have a rectangular cross section in a plane parallel to the etch stop layer 14. Thus, the passivation layer 30 defines a pair of opposed major sides 34 and a pair of opposed minor sides 36, 38 of the inlet 32.

The nozzle arrangement 10 includes an ejection actuator 40 and a refill actuator 42. The ejection actuator 40 and the refill actuator 42 are defined by the layer 28 of expansion material as a result of an etching process carried out on the expansion material.

The ejection actuator 40 is rectangular with a pair of opposed major sides 44 displaceable with respect to the major sides 34 of the inlet, a free end 46 and an opposed end 48 anchored at the minor side 40 of the inlet 32. Further, the ejection actuator 40 has an outer face 50 and an opposed inner face 52. The ejection actuator 40 is dimensioned to extend approximately two thirds of a length of the inlet 32 to span approximately two thirds of a length of the ink inlet 32.

The refill actuator 42 has a pair of major sides 54, which are displaceable with respect to the major sides 34 of the inlet 32, a free end 56 which is positioned adjacent the free end 46 of the ejection actuator 40, and an opposed end 58 which is anchored at the minor side 38 of the inlet 32. Further, the refill actuator 42 has an outer face 60 and an inner face 62.

The expansion material of the layer 28 has a coefficient of thermal expansion which is such that, when heated, the resultant expansion of the material is sufficient to perform work.

The ejection actuator 40 includes an actuating mechanism in the form of a heater element 64 positioned in the ejection actuator 40. The heater element 64 is connected to drive circuitry within the drive circuitry layer 18 with suitable vias 66.

Figure 3:
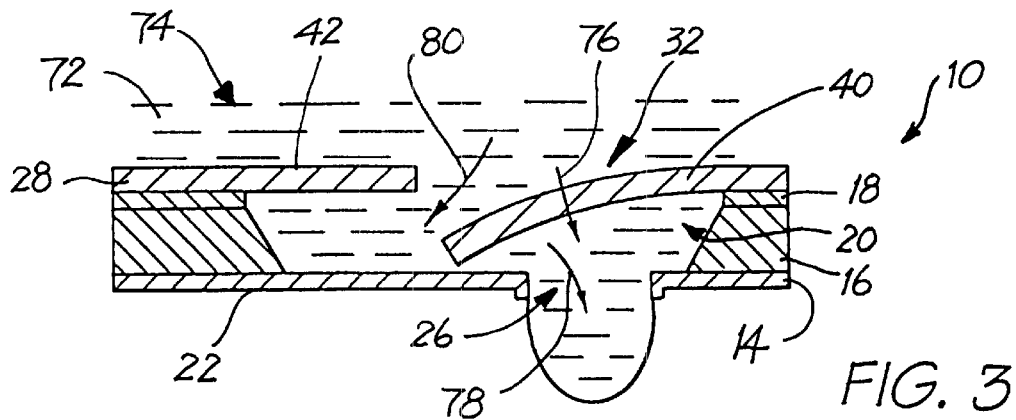
FIG. 3 shows a schematic view of the nozzle arrangement with an ejection actuator in an operative condition.

The heater element 64 is positioned proximate the outer face 50 of the ejection actuator 40. It follows that a region of the actuator 40 proximate the outer face 50 heats to a greater extent than the remainder of the ejection actuator 40. This results in the actuator 40 bending into the nozzle chamber 20 as shown in FIG. 3.

It should be noted that the heater element 64 extends from the anchored end 48 of the ejection actuator 40 so that an end portion 65 of the ejection actuator 40 does not incorporate the heater element 64. This serves to enhance ink ejection when the actuator 40 is activated, since the end portion 65 remains planar and thus acts as a paddle.

The refill actuator 42 includes an actuating mechanism in the form of a heater element 68 which is electrically connected to the drive circuitry in the drive circuitry layer 18 with suitable vias 70.

Figure 5:
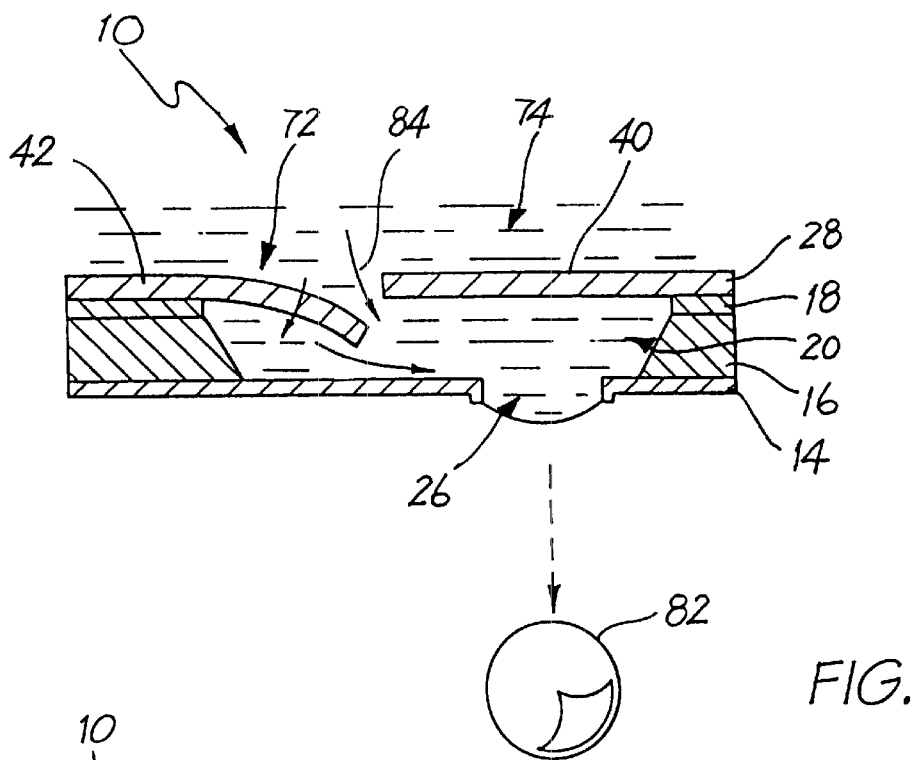
FIG. 5 shows a schematic view of the nozzle arrangement with a refill actuator in an operative condition.

The heater element 68 is positioned proximate the outer face 60 of the refill actuator 42. Thus, when the heater element 68 is activated, a region of the actuator 42 proximate the outer face 60 is heated to a greater extent than the remainder of the actuator 42. This results in that region expanding to a greater extent than the remainder of the actuator 42 resulting in the actuator 42 bending into the nozzle chamber 20 as shown in FIG. 5.

The ink ejection port 26 is positioned in a region which is generally aligned with the ejection actuator 40. Thus, when the ejection actuator 40 is activated, the actuator 40 bends towards the ink ejection port 26 to eject ink from the ink ejection port 26.

Operation of the nozzle arrangement 10 is indicated in FIGS. 2 to 7.

Figure 2:
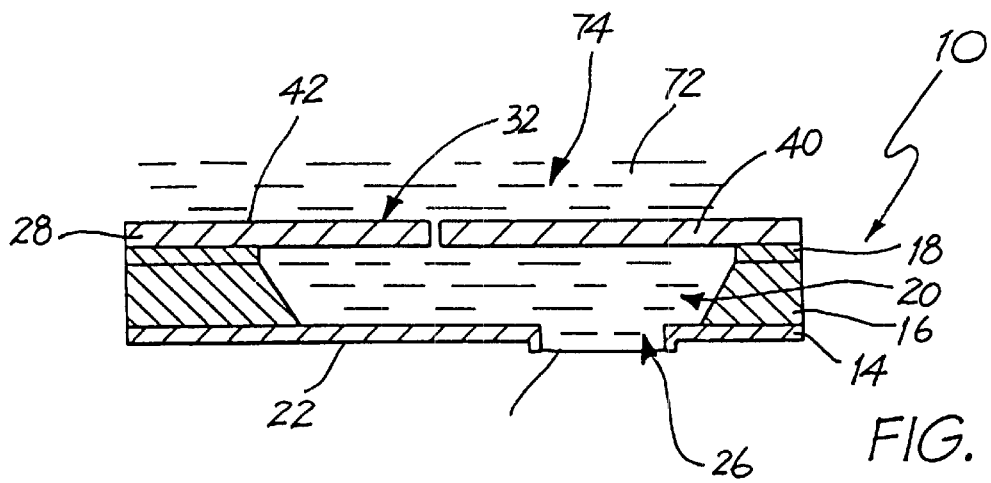
FIG. 2 shows a schematic view of the nozzle arrangement in a quiescent condition.

In FIG. 2, the nozzle arrangement 10 is shown in a quiescent condition. In this condition, the nozzle chamber 20 is filled with ink 72 that is in fluid communication with ink in an ink reservoir indicated at 74.

In FIG. 3, the ejection actuator 40 is actuated in the manner described above. This results in the actuator bending in the direction of an arrow 76. This causes the ejection of ink 72 in the direction of an arrow 78. At the same time, ink is drawn into the nozzle chamber 23 in the direction of an arrow 80.

Figure 4:
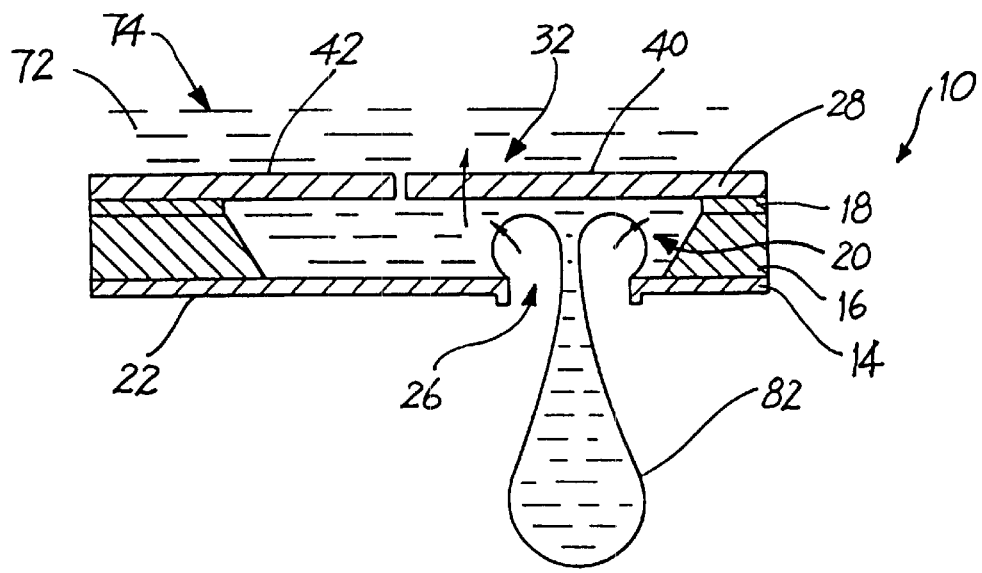
FIG. 4 shows a schematic view of the nozzle arrangement with the ejection actuator in a post-operative condition.

Upon deactivation of the heater element 64, the ejection actuator 40 returns to its inoperative condition as shown in FIG. 4. In order to facilitate this, the expansion material may have a Young's modulus which is suitably high so that the ejection actuator 40 can return under tension built up in the material when the actuator 40 is displaced into the condition shown in FIG. 3.

As a result of the return of the actuator 40 into its inoperative condition, the ink 72 is sucked back from the ink ejection port 26 resulting in separation of the ink 72 and the formation of a drop 82 which is shown finally separated in FIG. 5.

As can be seen in FIG. 5, once the actuator 40 has returned to its inoperative condition, the heater element 68 is activated, resulting in the refill actuator 42 bending into the nozzle chamber 20, as described previously. This results in ink 72 being drawn in the direction of an arrow 84 into the nozzle chamber 20. Further, this also results in ink 72 being squeezed from one side of the nozzle chamber 20 towards the ink ejection port 26. As a result, by controlling operation of the refill actuator 42, the nozzle chamber 20 can be rapidly refilled once the drop 82 has been ejected.

Figure 6:
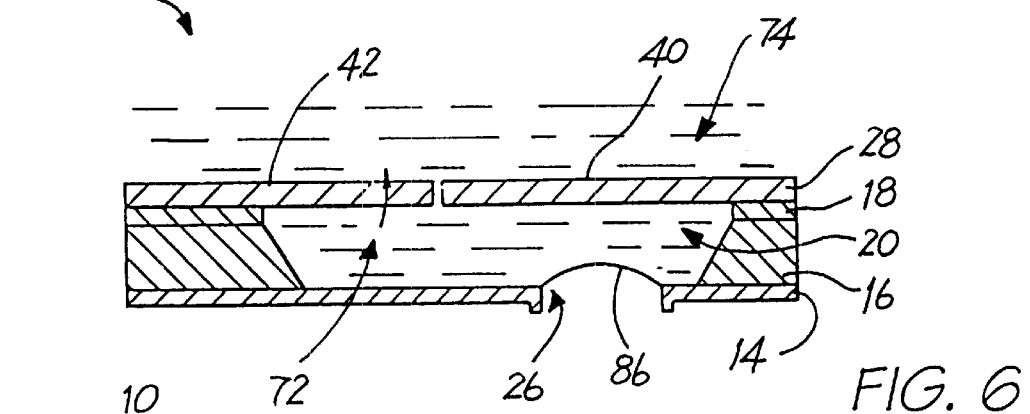
FIG. 6 shows a schematic view of the nozzle arrangement with the refill actuator in a quiescent condition.

In FIG. 6, the refill actuator 42 is returned to its inoperative condition also under tension built up in the refill actuator 42 as a result of the expansion material selected. This creates a drop of pressure within the nozzle chamber 20 resulting in a concave meniscus 86 formed in the ink ejection port 26. This pressure is gradually equalized as the nozzle chamber refills fully to the condition shown in FIG. 2.

The refill actuator 42 can be configured to return gradually to its inoperative condition to inhibit the nozzle chamber 20 from emptying again. This could also be achieved via the drive circuitry in the drive circuitry layer 18 being suitably controlled via a control system connected to the drive circuitry.

Figure 7:
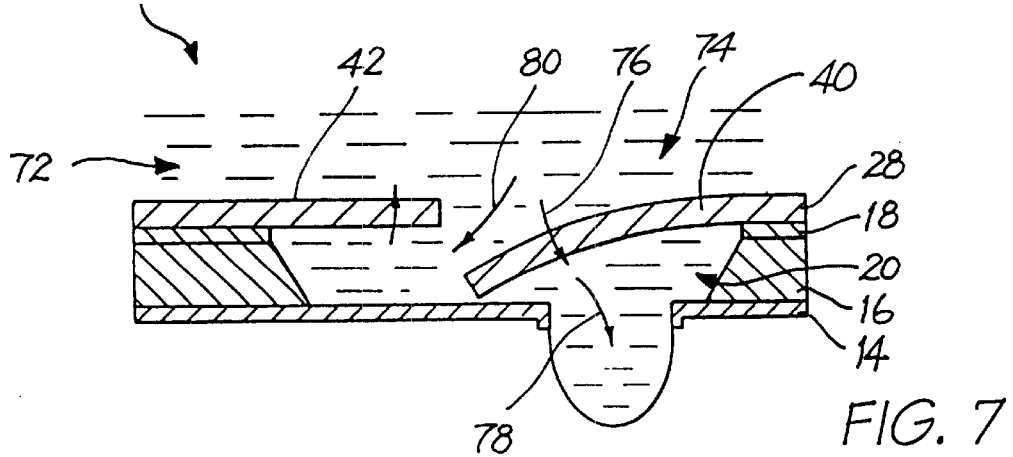
FIG. 7 shows a schematic view of the nozzle arrangement again with the actuator in an operative condition.

FIG. 7 shows the ejection actuator 40 again in an operative condition.

Applicant believes that this invention provides a means whereby a nozzle arrangement can be quickly and efficiently refilled once a drop has been ejected. As set out in the preamble, this is an important objective to be achieved in the design and manufacture of such nozzle arrangements.

I claim:

1. A nozzle arrangement for an ink jet printhead, the nozzle arrangement comprising
   a substrate;
   nozzle chamber walls arranged on the substrate to define a nozzle chamber;
   at least one micro-electromechanical ejection actuator that is operatively positioned with respect to the nozzle chamber, the, or each, ejection actuator being displaceable, upon receipt of an electrical signal, between an inoperative condition and an operative condition to eject ink from the nozzle chamber; and
   at least one micro-electromechanical refilling actuator that is operatively positioned with respect to the nozzle chamber, the, or each, refilling actuator being displaceable, upon receipt of an electrical signal, between an inoperative condition and an operative condition to direct ink into a zone in which the ink can be acted on by the ejection actuator, subsequent to the ejection of ink from the nozzle chamber.

2. A nozzle arrangement as claimed in claim 1, which is the product of an integrated circuit fabrication technique.

3. A nozzle arrangement as claimed in claim 2, in which the substrate includes a wafer substrate and a drive circuitry layer positioned on the wafer substrate, the drive circuitry layer being connected to both the ejection and refill actuators.

4. A nozzle arrangement as claimed in claim 3, in which the wafer substrate is etched to define the nozzle chamber walls.

5. A nozzle arrangement as claimed in claim 4, in which an etch stop layer is positioned on the wafer substrate, in opposition to the drive circuitry layer, the etch stop layer defining a roof wall of the nozzle chamber and an ink ejection port in fluid communication with the nozzle chamber.

6. A nozzle arrangement as claimed in claim 5, which includes one ejection actuator and one refill actuator, both actuators being defined by a layer of expansion material that is positioned on the drive circuitry layer to span an inlet of the nozzle chamber so that the actuators are substantially co-planar, the expansion material having a coefficient of thermal expansion which is such that heating and subsequent expansion of the material is sufficient to perform work.

7. A nozzle arrangement as claimed in claim 6, in which the inlet has a substantially rectangular cross section in a plane parallel to the etch stop layer with the ejection actuator anchored at one side of the inlet and the refill actuator anchored at an opposed side of the inlet, the actuators both being substantially rectangular and dimensioned to be partly received in the nozzle chamber with free ends of the actuators positioned adjacent each other.

8. A nozzle arrangement as claimed in claim 6, in which the etch stop layer defines the ink ejection port in a position generally aligned with the ejection actuator so that movement of the ejection actuator towards the etch stop layer into an ejection zone results in the ejection of ink from the ink ejection port.

9. A nozzle arrangement a claimed in claim 8, in which the refill actuator is positioned so that displacement of the refill actuator into the nozzle chamber serves to drive ink from a remaining zone of the nozzle chamber into the ejection zone and to permit the ingress of ink from the ink supply into the nozzle chamber subsequent to the ejection actuator being displaced from its operative condition into its inoperative condition.

10. A nozzle arrangement as claimed in claim 6, in which the actuating mechanism of both the ejection actuator and the refill actuator is in the form of a heating element positioned in each actuator proximate an outer surface of each actuator so that activation of the heating elements results in a heating and subsequent expansion of a portion of each actuator proximate the outer surface so that the actuators are bent into the nozzle chamber.

11. An ink jet printhead which comprises a substrate; and
   a plurality of nozzle arrangements positioned on the substrate, each nozzle arrangement comprising
      nozzle chamber walls arranged on the substrate to define a nozzle chamber;
      at least one micro-electromechanical ejection actuator that is operatively positioned with respect to the nozzle chamber, the, or each, ejection actuator being displaceable between an inoperative condition and an operative condition to eject ink from the nozzle chamber; and
      at least one micro-electromechanical refilling actuator that is operatively positioned with respect to the nozzle chamber, the, or each, refilling actuator being displaceable between an inoperative condition and an operative condition to direct ink into a zone in which the ink can be acted on by the ejection actuator, subsequent to the ejection of ink from the nozzle chamber.

12. A method of ejecting ink from a nozzle arrangement of an ink jet printhead, the nozzle arrangement including a substrate, nozzle chamber walls arranged on the substrate to define a nozzle chamber, at least one micro-electromechanical ejection actuator that is displaceable between an inoperative and an operative condition to facilitate the ejection of ink from the nozzle chamber and at least one micro-electromechanical refill actuator that is displaceable between an operative condition and an inoperative condition to direct ink into a zone in which the ink can be acted upon by the ejection actuator, the method including the steps of:
   supplying the nozzle chamber with ink;
   activating the, or each, ejection actuator so that ink is ejected from the nozzle chamber; and activating the, or each, refill actuator at a predetermined time after activation of the, or each, ejection actuator so that ink is directed into said zone to be acted upon again by the, or each, ejection actuator, if required.

13. A method as claimed in claim 12, which includes the steps of:

activating the, or each, ejection actuator so that the, or each, ejection actuator is displaced from its inoperative condition to its operative condition;

de-activating the, or each, ejection actuator so that the, or each, ejection actuator returns to its inoperative condition; and activating the, or each, refill actuator subsequent to the, or each, ejection actuator returning to its inoperative condition.

* * * * *